United States Patent [19]

Wermeister

[11] 4,212,567

[45] Jul. 15, 1980

[54] MOUNTING ELEMENT FOR A REVERSIBLE TOOL TIP OR THE LIKE

[75] Inventor: Günter Wermeister, Ratingen, Fed. Rep. of Germany

[73] Assignee: Sandvik Aktiebolag, Sandviken, Sweden

[21] Appl. No.: 952,082

[22] Filed: Oct. 17, 1978

[30] Foreign Application Priority Data

Oct. 19, 1977 [DE] Fed. Rep. of Germany ....... 2746958

[51] Int. Cl.$^2$ .............................................. B26D 1/12
[52] U.S. Cl. ..................................................... 407/46
[58] Field of Search ............................. 407/40, 46, 101

[56] References Cited

U.S. PATENT DOCUMENTS

| | | | |
|---|---|---|---|
| 2,751,663 | 6/1956 | Lewzinger | 407/46 |
| 3,104,452 | 9/1963 | Greenleaf | 407/101 |
| 3,141,228 | 7/1964 | Bader et al. | 407/101 |
| 3,148,436 | 9/1964 | Werth | 407/101 |
| 3,742,565 | 7/1973 | Boboltz et al. | 407/46 |
| 3,930,529 | 1/1976 | Fawcett | 407/46 |

Primary Examiner—Harrison L. Hinson
Attorney, Agent, or Firm—Burns, Doane, Swecker & Mathis

[57] ABSTRACT

A mounting element is disclosed, for use in supporting a reversible cutting tip in a tool body. The supporting element comprises a cylindrical portion configured to be inserted radially into a tool body and form an axial mounting for the tool tip. An arm portion is connected to the projects at substantially a right angle therefrom to form a radial mounting for the tool tip.

5 Claims, 6 Drawing Figures

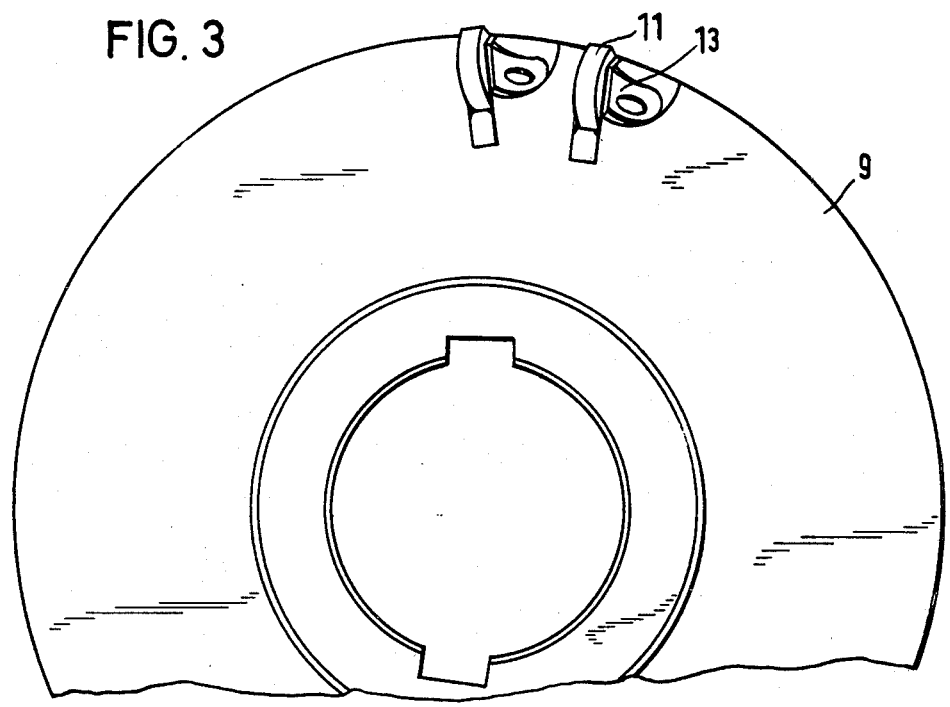
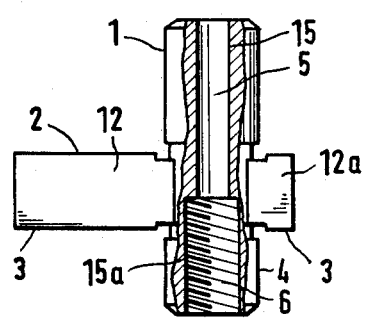
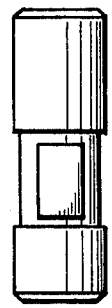
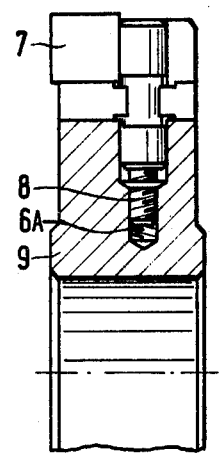
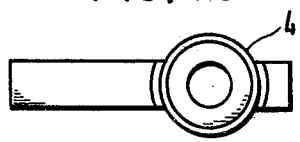

4,212,567

MOUNTING ELEMENT FOR A REVERSIBLE TOOL TIP OR THE LIKE

BACKGROUND AND OBJECTS OF THE INVENTION

This invention relates to a mounting element for a reversible tool tip or the like in a tool body, more particularly a milling cutter head.

The tool tips or the like in tool bodies provided with reversible tool tips, e.g. milling cutter heads, are normally mounted in support elements disposed beside them which have an axial support for the tool tip. These support elements are made from a hard material in order to avoid changes of shape which might occur as a result of the insertion of the tool tips. The result of this construction is that the size of each tip mounting is increased in the circumferential direction of the tool body, so that there is a limit to the number of tool tips that can be accommodated on the cutter head.

Various attempts have been made to insert tool tips in cutter heads without support elements. Sockets of hard material have been welded into the recesses accommodating the tool tips, but a great disadvantage of this is that the welding process results in thermal stresses in the tool body, with consequent warping thereof, so that inaccuracies occur which result in machining tolerances which in many cases are inadmissible.

The object of the invention is to provide a mounting element of the above kind which is of small dimensions in the circumferential direction of the tool body and hence enables a large number of reversible tool tips to be accommodated in a tool body, and which ensures very high accuracy.

BRIEF SUMMARY OF THE INVENTION

To this end, according to the invention, a support element consists of a cylindrical part which is adapted to be inserted radially into the tool body and forming an axial mounting for the reversible tool tip, and an arm which is integrally connected to the cylindrical part, the arm projecting substantially at right angles therefrom, and forms a radial mounting for the tool tip.

A mounting element of this kind is easily produced with considerable accuracy outside the tool body. Only bores and slots need be formed in the tool body, this being a simple operation possible with high accuracy. Nor is there any heating of the tool body resulting in warping thereof and hence inaccuracy.

Preferably, the arm is so disposed on the cylindrical part that when the mounting element is inserted, the cylindrical part forms, on that side of the arm which is remote from the circumference of the tool body, a part which projects beyond said arm. The cylindrical part can have a projection forming a continuation of the arm at the place diametrically opposite the arm. This creates other supporting surfaces which ensure secure location of the mounting element.

The arm may be rectangular in cross-section.

Advantageously, the cylindrical part has a screwthreaded bore at its front end as considered in the direction of insertion, and the screwthreaded bore communicates with a bore which leads out through the rest of the cylindrical part and which serves as a passage for a key by means of which a screw fixing the mounting element can be actuated. Preferably, a differential screw is provided for fixing the mounting element in the tool body, said differential screw displacing the mounting element outwardly when the screw is released so that the mounting element can be engaged and removed from the tool body.

BRIEF SUMMARY OF THE DRAWING

The invention is explained in detail hereinafter with reference to exemplified embodiments illustrated in the drawing wherein:

FIG. 1a is a side elevation of a mounting element according to the invention in partial longitudinal section;

FIG. 1b is a side elevational view of the mounting element of FIG. 1 turned through an angle of ninety degrees;

FIG. 1c is a plan view of the mounting element;

FIG. 3 is a view from the machining side showing a cutter head provided with circular reversible tool tips; and FIG. 4 is a partial section through a cutter head provided with the mounting elements according to the invention and having rectangular reversible tool tips.

DETAILED DESCRIPTION OF A PREFERRED EMBODIMENT OF THE INVENTION

Figure 2:
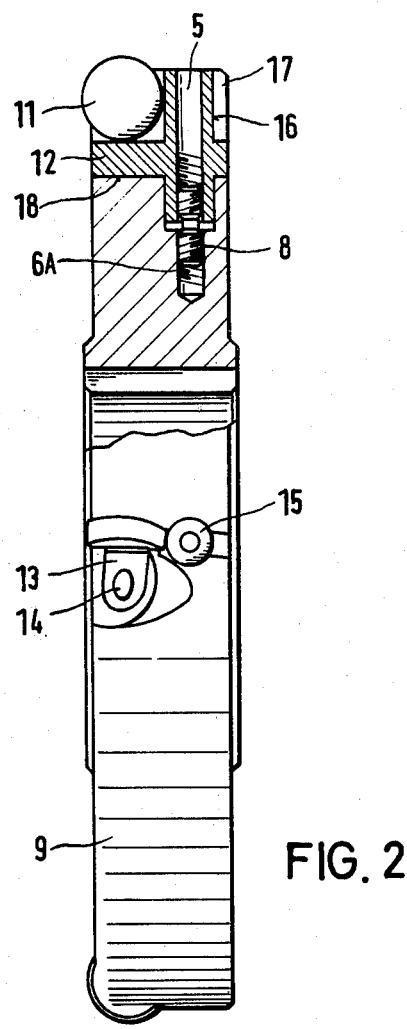
FIG. 2 is a side elevation of a cutter head of a side milling cutter containing mounting elements according to the invention and having circular reversible tool tips.

The mounting element shown in FIG. 1 consists of a single part. For example it can be manufactured by precision casting. The element can be machined after casting, and the screwthreaded bore 6 can also be made during that operation for example. The element can then be hardened and ground, the axial mounting surfaces 1 and 4, and the radial mounting surfaces 2 and 3, being made with high dimensional accuracy. The arm 12 projecting substantially at right angles from the cylindrical part 15 is so disposed on the latter that a cylindrical part 15a having a screwthreaded bore 6 projects on its side which, when inserted, extends away from the circumference of the tool body. The screwthreaded bore 6 is connected to another axial bore 5 which leads to the freely accessible end of the cylindrical part 15. A projection 12a forms a continuation of the arm 12 and serves further to support the mounting element.

As will be seen from FIG. 2, bores 16 are formed in the circumference of th tool body 9 which, in FIG. 2, is the cutter head of a side milling cutter, and then slots 17 are cut centrally with respect to the bores 16. Another screwthreaded bore 6 a is formed at the base of the bore 16 to receive a differential screw 8 which serves for fixing the mounting element. This screw has two screwthreads, a left-hand thread and a right-hand thread, which engage in the corresponding screwthreaded bores 6 a. The differential screw 8 and hence the mounting element can be tightened by means of a hexagonal key introduced through the bore 5. The mounting element then bears via the radial supporting surfaces 3 against the base 18 of the groove 17. The extension 12a also bears by its underside 3 against the corresponding surface of the base of the groove, so that here again the mounting element is additionally supported. The mounting element also bears against the inner wall of the bore by the ground cylindrical surfaces. The outwardly pointing part 1 of the cylindrical surface acts as an axial mounting surface for the cutter insert in that it supports the insert against axial movement. The surface 2 of the arm 12 acts as a radial supporting surface for the cutter insert in that it supports the insert against inward radial movement.

FIG. 3 is a bottom plan view of a milling cutter, showing two inserted circular reversible cutting tools 11, which are conventionally clamped by means of keys 13 and screws 14. The mounting element according to the invention is suitable for mounting reversible cutting tools of various kinds. Square tools 7 can be used in addition to circular tools, as shown for example in FIG. 4. Alternatively, the mounting element can be used for reversible cutting tools of other shapes, e.g. triangular, in which case the mounting surface 2 just has to be shaped appropriately to form a suitable angle between the surfaces 1 and 2.

In addition to enabling a very large number of reversible cutting tools to be mounted on a given milling cutter head, the mounting element according to the invention enables very high accuracy values to be obtained, so that machining quality can be greatly increased.

I claim:

1. A mounting element for use on a rotary tool body for supporting a reversible cutting tip thereon, said supporting element comprising a cylindrical portion and an arm portion formed integrally of one piece, said cylindrical portion being configured for insertion radially into the tool body so that its cylindrical outer surface is arranged to abut an outer wall of the cutting tip to form an axial support therefor, said arm portion projecting at substantially a right angle from said cylindrical portion to form a radial support for the tool tip, said cylindrical portion being provided with a fastening screw disposed within and projecting beyond said cylindrical portion in a direction radially inwardly of a circumference of the tool body and being threadably connectible in a threaded radial bore of the tool body, said cylindrical portion being hollow so that the fastening screw is accessible to a screw-actuating tool from a free end of the cylindrical portion.

2. A mounting element according to claim 1, wherein said fastening screw comprises a differential screw threadably connected within said cylindrical portion.

3. A mounting element according to claim 1, wherein said arm portion is positioned intermediate opposite ends of said cylindrical portion such that with the mounting element disposed in a tool body, said cylindrical portion includes a projecting portion projecting radially beyond said arm in a direction away from a circumference of the tool body.

4. A mounting element according to claim 1, wherein a projection extends from said cylindrical portion in a direction diametrically opposite said arm portion so as to form a continuation of said arm portion.

5. A mounting element according to claim 1, wherein said arm portion is of rectangular cross-section.

* * * * *